No. 757,823. PATENTED APR. 19, 1904.
J. MANDERSON.
SHARPENING ATTACHMENT FOR BAND CUTTERS AND FEEDERS.
APPLICATION FILED AUG. 29, 1903.
NO MODEL. 2 SHEETS—SHEET 1.
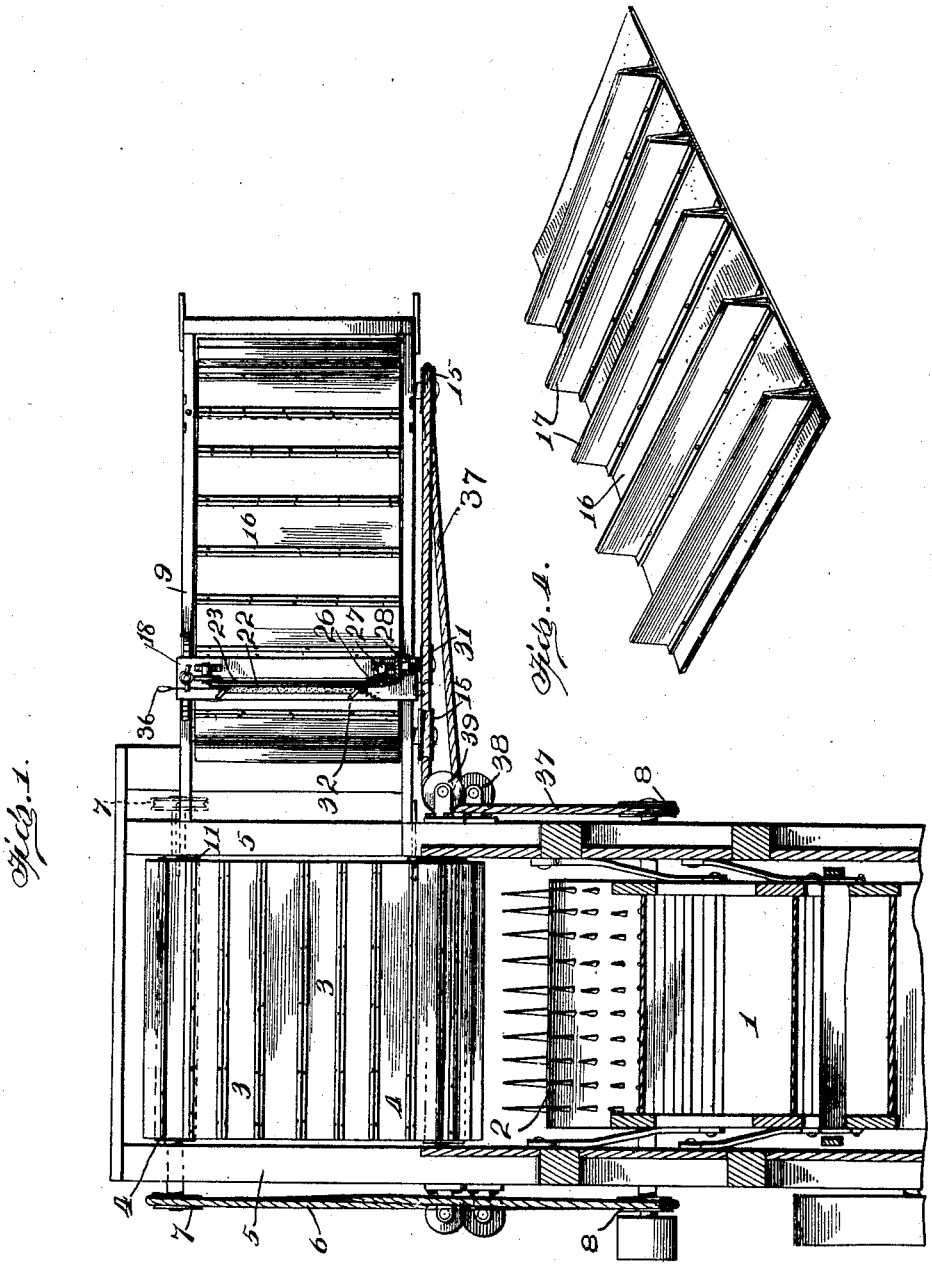
WITNESSES:
INVENTOR No. 757,823. PATENTED APR. 19, 1904.
J. MANDERSON.
SHARPENING ATTACHMENT FOR BAND CUTTERS AND FEEDERS.
APPLICATION FILED AUG. 29, 1903.
NO MODEL. 2 SHEETS—SHEET 2.
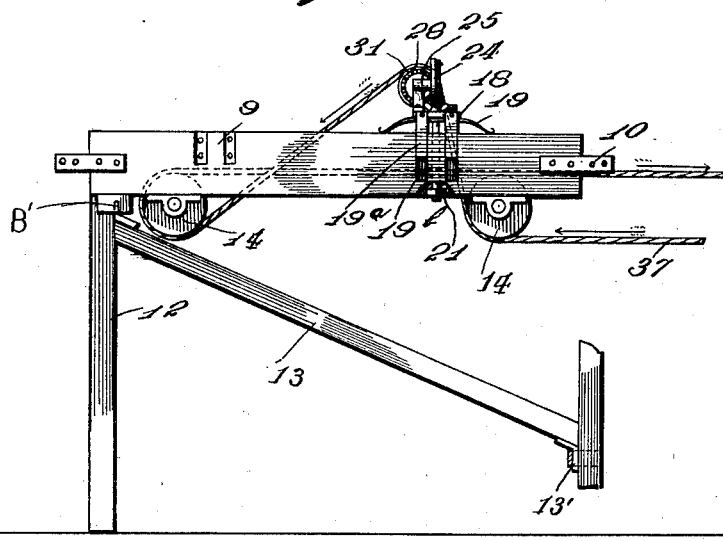
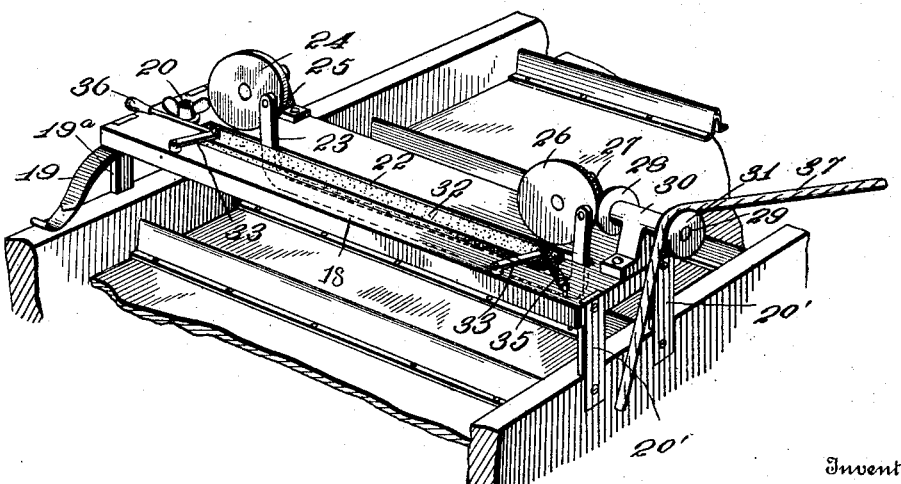

No. 757,823. Patented April 19, 1904.

UNITED STATES PATENT OFFICE.

JOHN MANDERSON, OF SEATTLE, WASHINGTON, ASSIGNOR OF ONE-HALF TO HAROLD J. BANCROFT, OF SEATTLE, WASHINGTON.

SHARPENING ATTACHMENT FOR BAND-CUTTERS AND FEEDERS.

SPECIFICATION forming part of Letters Patent No. 757,823, dated April 19, 1904.

Application filed August 29, 1903. Serial No. 171,263. (No model.)

*To all whom it may concern:*

Be it known that I, JOHN MANDERSON, a citizen of Canada, residing at Seattle, in the county of King and State of Washington, have invented certain new and useful Improvements in Sharpening Attachments for Band-Cutters and Feeders; and I do hereby declare the following to be a full, clear, and exact description of the invention, such as will enable others skilled in the art to which it appertains to make and use the same.

This invention relates to improvements in threshing-machines, and more particularly to band-cutting and feeding mechanisms therefor.

The object in view is the provision of mechanism for feeding sheaves of grain to a thresher and cutting the bands of said sheaves prior to their introduction to the threshing machinery.

It further consists in certain other novel constructions, combinations, and arrangements of parts, as will be hereinafter fully described and claimed.

In the accompanying drawings, Figure 1 represents a top plan view of a band-cutter and feeder embodying the features of the present invention and illustrated as applied to a threshing-machine. Fig. 2 represents a view in side elevation of the band-cutter and a feeder detached. Fig. 3 represents a perspective view of a fragment of the same. Fig. 4 represents an enlarged detail perspective view of a section of the feeding-apron.

Referring to the drawings by numerals, 1 indicates any suitable and well-known threshing mechanism provided with a threshing-cylinder 2, arranged within the common form of concave, designed to receive grain fed into the same by means of an endless apron 3, carried by rollers 4 4, journaled in a framework 5 and actuated by a driving-belt of any preferred type 6, passing about one of the pulleys 7, carried by the projecting ends of the journals of the outer roller 4. It will be observed that a pulley 7 is carried by each of the journals of the outer roller 4 and that the belt 6 receives its power from a pulley 8, carried by one end of the driving-shaft of the threshing mechanism 1. The opposite end of said driving-shaft carries a similar pulley 8 for purposes hereinafter set forth.

A suitable frame 9 is movably connected to the framework 5 by means of tenons 10, projecting through mortises in the framework, similar tenons extending from the opposite end of frame 9 for purposes hereinafter set forth. A locking-pin 11 is passed through each of the inserted ends of tenons 10 for effectually preventing lateral displacement of the framework 9, said frame being supported at its outer end by legs 12 and inclined braces 13. The braces 13 are preferably formed with projecting pins 13' at their ends, entering suitable brackets for removably retaining the braces in position.

Journaled in the frame 9 are suitable carrying-rolls 14 14, provided with driving-pulleys 15, carried by their journals. Mounted upon and driven by the rolls 14 is an endless carrying-apron 16, provided with a series of transversely-arranged cleats 17, each cleat 17 being preferably comparatively wide and spaced from the next contiguous cleat a distance approximately equal to the thickness of a sheaf.

A supporting-plate 18 extends transversely across the frame 9 above the apron 16 and is at one end supported by a suitable spring 19 upon one side of said framework and retained in position by a bolt 20 entering the framework and threaded into a fixed nut 21, whereby in operation the bolt 20 may be rotated for compressing the spring 19 or permitting the same to expand, and thereby raise or lower one end of the plate 18. Guiding-bars 19$^a$ extend downwardly from that end of plate 18 resting upon spring 19, and said bars are limited against lateral play by grooves 19$^b$, formed in the side of frame 9. The opposite end of plate 18 to that carried by spring 19 is supported by suitable brackets 20', fixed to frame 9 and also fixed to said plate, the brackets being preferably of strap material adapted to permit the vertical play occasioned by the movement of the bolt 20. The plate 18 is formed with a longitudinal slot 22, into which is hung the band-cutting knife 23. The knife 23 is pivotally connected at one end to the side of any suitable wheel 24, journaled on a bracket 25, carried by plate 18, and at the other end said knife is pivotally connected to the flat face of a beveled gear 26. The gear 26 has its shaft journaled in a suitable bracket 27 and meshes with a similar gear 28. The gear 28 is carried by a stub-shaft 29, supported by journal-bearings 30, carried by plate 18, and the outer end of the shaft 29 carries an operating-pulley 31.

Resting upon the plate 18 is a bar 32, arranged longitudinally of said plate and pivotally engaged by links 33 33, in turn pivoted to the plate 18. The bar 32 may be formed of any preferred material adapted for sharpening a blade—as, for instance, a block of stone or emery or a suitable file. One of the links 33 is engaged by a spring 35, drawing the same laterally in the direction away from the slot 22. A handle 36 is preferably provided for facilitating movement of the bar 32 longitudinally against the action of spring 35 for causing said bar to engage the knife 33 during its reciprocatory movement, whereby said knife may be easily and quickly sharpened without necessitating the stopping of the threshing operation. After the knife 33 has been sufficiently sharpened the handle 33 is released and the bar 32 moves away from the knife under the action of spring 35.

A suitable endless belting 37 passes about the pulley 8 opposite that engaged by belting 6 and passing through idlers 38 and 39 engages pulleys 15 15 and pulley 31 for actuating the same.

In operation the sheaves are thrown onto the apron 16 and naturally fall between the cleats 17 as they are moved toward the knife 23. As the pulley 31 is rotated the knife 23 will be given a gyratory movement and will engage each bundle as it passes beneath the same, the positive retention of the bundles by the cleats 17 preventing any lateral displacement and insuring the severance of the bands surrounding the same. The loose grain is carried on, after the bundles have been cut, by the apron 16 and discharged onto the apron 3. If large bundles are being operated upon, the bolt 20 is threaded in a direction for permitting one end of plate 18 to be lifted by spring 19 a suitable distance above the apron 16 for permitting the passage of the butt-ends of the bundles, and when small sheaves are operated upon said bolt is threaded downwardly for compressing the spring 19 and bringing the end of plate 18 nearer the apron 16.

At times I may find it desirable to employ the present improved band-cutter and feeder at one side of the apron 3 and at other times to employ the same at the opposite side thereof. When I desire to use the said improvement on the opposite side to that indicated in Fig. 1, I simply remove the keys 10 and belt 37, remove the braces 13, and position the frame 9 on the opposite side of the apron 3, introducing the opposite tenons 10 into suitable mortises provided therefor, replacing the braces 13, and positioning the belt 37 on the pulley 8, from which the belt 6 has been removed. The belt 6 is placed upon the opposite pulley 8 from that formerly engaged by the same and is caused to actuate the opposite pulley 7. After the frame 9 has been positioned the plate 18 is loosened by threading out the bolt 20 and detaching brackets 20', and said plate is then moved longitudinally of the frame 9 toward the threshing mechanism and the parts positioned for operation by the threading of the bolt 20 into a fixed nut arranged for its reception and securing the brackets 20' to the side of the frame 9. The mechanism after the changes indicated is ready for operation with the band-cutter and feeder upon the opposite side of the belt 3 from that formerly occupied, the same having been simply carried over across the threshing mechanism to the opposite side and the former outer end of frame 9 now being the inner end.

Having thus fully described my invention, what I claim as new, and desire to secure by Letters Patent, is—

1. In a device of the class described, the combination of a frame and carrying means supported thereby, of band-cutting means supported above said carrier, a spring supporting said band-cutting means, means for adjusting said band-cutting means vertically against the tension of said spring, and means carried by the device for guiding the said band-cutting means in its movement.

2. In a device of the class described, the combination of a frame and carrier-apron, of a plate arranged above said frame, a bracket supporting one end of said plate, a spring supporting the opposite end thereof, guiding means for said plate, and means for adjusting said plate against the tension of said spring and band-cutting means carried by said plate.

3. In a device of the class described, the combination with a frame and a carrier-apron, of a plate above said frame, a spring supported on said frame and carrying said plate, band-cutting means carried by said plate, and means for varying the tension of said spring.

4. In a device of the class described, the combination with a frame and a carrier-apron, of a plate positioned above the same, band-cutting means carried by said plate, a cushion interposed between said plate and frame, a fixed nut carried by the frame, and a bolt engaging said plate threaded into said fixed nut.

5. In a mechanism of the class described, the combination with a carrier-apron, a band-cutting knife arranged transversely thereof, means for swinging said knife longitudinally and edgewise, of a sharpening-tool contiguous to said knife and extending approximately parallel with the same, and means for moving said tool into the plane of the knife, while maintaining the parallelism.

6. In a mechanism of the class described, the combination with a carrier-apron, and a slotted plate arranged above the same, of a knife swinging within said slot, a sharpening-tool mounted contiguous to the plane of said slot, links pivotally engaging said sharpening-tool, a spring engaging one of said links and drawing the same away from said slot, and means adapted to facilitate the swinging of said tool upon its links for bringing the same into the plane of one wall of said slot.

In testimony whereof I hereunto affix my signature in presence of two witnesses.

JOHN MANDERSON.

Witnesses:
G. WARD KEMP,
HAROLD J. BANCROFT.